US007888899B2

(12) United States Patent
Yeh et al.

(10) Patent No.: US 7,888,899 B2
(45) Date of Patent: Feb. 15, 2011

(54) SUBSTRATE SPLITTING APPARATUS AND A METHOD FOR SPLITTING A SUBSTRATE

(75) Inventors: Li-Ya Yeh, Hsin-Chu (TW); Chih-Wei Chu, Hsin-Chu (TW); Shu-Chih Wang, Hsin-Chu (TW); Wen-Chang Hsieh, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 416 days.

(21) Appl. No.: 12/055,004

(22) Filed: Mar. 25, 2008

(65) Prior Publication Data

US 2008/0238346 A1 Oct. 2, 2008

(30) Foreign Application Priority Data

Mar. 30, 2007 (TW) .............................. 96111506 A

(51) Int. Cl.
*G05B 11/01* (2006.01)

(52) U.S. Cl. ........................... 318/560; 83/434; 83/435; 83/494

(58) Field of Classification Search ................. 318/560, 318/561, 400.14, 700, 280; 83/434, 435, 83/271, 284, 872, 53, 215, 350, 483, 490, 83/494, 578, 870, 887; 310/323.18
See application file for complete search history.

(56) References Cited

U.S. PATENT DOCUMENTS 6,595,094 B1 * 7/2003 Kondo et al. ............... 83/471.2
6,629,553 B2 * 10/2003 Odashima et al. ........... 156/584
6,901,670 B2 * 6/2005 Wakayama et al. .......... 33/18.1

(Continued)

FOREIGN PATENT DOCUMENTS

JP 2001206727 7/2001

(Continued)

OTHER PUBLICATIONS

English language translation of abstract of JP 2003089538.

(Continued)

*Primary Examiner*—Walter Benson
*Assistant Examiner*—Antony M Paul
(74) *Attorney, Agent, or Firm*—Thomas, Kayden, Horstemeyer & Risley, LLP

(57) ABSTRACT

A substrate splitting apparatus and a method for splitting a substrate using the substrate splitting apparatus are provided. The substrate splitting apparatus includes a servo motor, a transmission device, a substrate breaking bar, and a stage. One end of the transmission is directly or indirectly coupled to the servo motor while the other end is coupled with the breaking bar. The stage has a load-lock surface and the load-lock surface faces the breaking bar. The servo motor drives the transmission device to move the breaking bar toward the load-lock surface. A substrate with a pre-crack on the bottom is disposed on the load-lock surface. The servo motor drives the substrate breaking bar to move towards or away from the pre-crack. The method of splitting includes the following steps: forming a pre-crack on the substrate; controlling the servo motor to drive the breaking bar to move towards the substrate; and controlling the breaking bar to press the substrate at the pre-crack.

26 Claims, 16 Drawing Sheets

U.S. PATENT DOCUMENTS

| | | | | |
|---|---|---|---|---|
| 7,347,766 | B2 * | 3/2008 | Nitta et al. | 451/11 |
| 7,426,883 | B2 * | 9/2008 | Nishio et al. | 83/435 |
| 7,439,665 | B2 | 10/2008 | Wakayama | |
| 2005/0233122 | A1 * | 10/2005 | Nishimura et al. | 428/209 |

FOREIGN PATENT DOCUMENTS

| | | |
|---|---|---|
| JP | 2002160933 | 6/2002 |
| JP | 2003089538 | 3/2003 |

OTHER PUBLICATIONS

English language translation of abstract of JP 2002160933.
English language translation of abstract of JP 2001206727.
Taiwan Office Action dated Jun. 21, 2010.

* cited by examiner

SUBSTRATE SPLITTING APPARATUS AND A METHOD FOR SPLITTING A SUBSTRATE

This application claims priority to Taiwan Application Serial Number 96111506, filed Mar. 30, 2007, which is herein incorporated by reference.

BACKGROUND OF THE INVENTION

1. Field of the Invention

The present invention relates to a substrate splitting apparatus and a method of splitting substrate, by using the substrate splitting apparatus; substantially, the present invention relates to a glass substrate splitting apparatus and a method of splitting glass substrates, by using the glass splitting apparatus.

2. Description of the Prior Art

Glass planking, organic polymer planking and other types of planking are used in the LCD (liquid crystal display) device and in other plane surface display devices. The planking can be used for the substrates of TFT (thin film transistor), the substrates of ordinary circuits, optics components and other applications. In order to accommodate the manufacture of display devices in different sizes, a planking has to be cut into pieces of different sizes. Furthermore, consideration is to be given to the material characteristics of different plankings during cutting as well as the structure strength of planking after cutting, in order to ensure the quality of products.

Take the glass substrate for example, FIG. 1 is a conventional cutting apparatus for splitting a glass substrate. As FIG. 1 shows, the splitting apparatus including a stage 70. The stage 70 loads a glass substrate 20 from a substrate conveyor installation. A bracket 30 is mounted on the stage 70. A substrate breaking bar 50 is disposed below bracket 30. The substrate breaking bar 50 can move upwards and downwards with respect to the bracket 30 and correspond to the position of the pre-crack (not shown) at the bottom of the glass substrate 20. A hammering device is disposed above the substrate breaking bar 50. As the hammering device strikes downwards, the substrate breaking bar 50 also moves downwards and then hammers the top surface of the glass substrate 20 relative to the position of a pre-crack. The glass substrate 20 then splits into two halves with respect to the transverse direction of the pre-crack, and thus the objective of cutting the glass substrate 20 is achieved.

However, the hammering causes the substrate breaking bar 50 to move in high speed, and this may break the glass substrate 20. The depth of pre-crack has to be increased to reduce the possibilities of broken substrate. However, the position of pre-crack is situated at the edge of glass substrate 20 after the cutting. The pre-crack deepening process will also have an influence on the structure of glass substrate 20 which also affect the strength of the edge structure of the glass substrate 20 after cutting.

SUMMARY OF THE INVENTION

It is an objective of the present invention to provide a substrate splitting apparatus and a method of using the apparatus, to improve the structure strength of split substrate edge.

It is another objective of the present invention to provide a substrate splitting apparatus and a method of using the apparatus to improve the quality of the split substrate.

It is another objective of the present invention to provide a substrate splitting apparatus and a method of using the apparatus to co-ordinate with the process of cutting thinner substrates.

The substrate cutting apparatus includes a servo motor, a transmission device, a substrate breaking bar and a stage. The stage includes a load-lock surface, whereas the servo motor, transmission device and the substrate breaking bar are disposed above the load-lock surface of the stage. One end of the transmission device is coupled with the servo motor to output the power generated from the servo motor. The substrate breaking bar is coupled with the other end of the transmission device. The load-lock surface faces the substrate breaking bar and the servo motor uses the transmission device to drive the substrate breaking device to move towards the load-lock surface. The substrate is disposed above the load-lock surface, and a pre-crack is formed at the bottom of the substrate. The orientation of the substrate breaking bar is identical to the orientation of the pre-crack, and the servo motor drives the substrate breaking bar to move towards or away from the pre-crack.

The method of splitting substrate of the present invention includes the following steps: forming a pre-crack on the substrate, controlling the servo motor to drive the substrate breaking bar to move towards the substrate and controlling the substrate breaking bar to press the substrate at the position corresponding to the pre-crack. The steps of controlling the servo motor includes changing the speed of servo motor when the substrate breaking bar is situated in different stroke; and detecting the top surface of the substrate using a pressure sensor in order to determine the position where the speed of the servo motor should change. Furthermore, steps of pressing the substrate includes detecting pressure on substrate breaking bar using the pressure sensor and halting the advance of substrate breaking bar when the detected pressure on the substrate breaking bar reaches a pre-determined value.

Figure 4A:
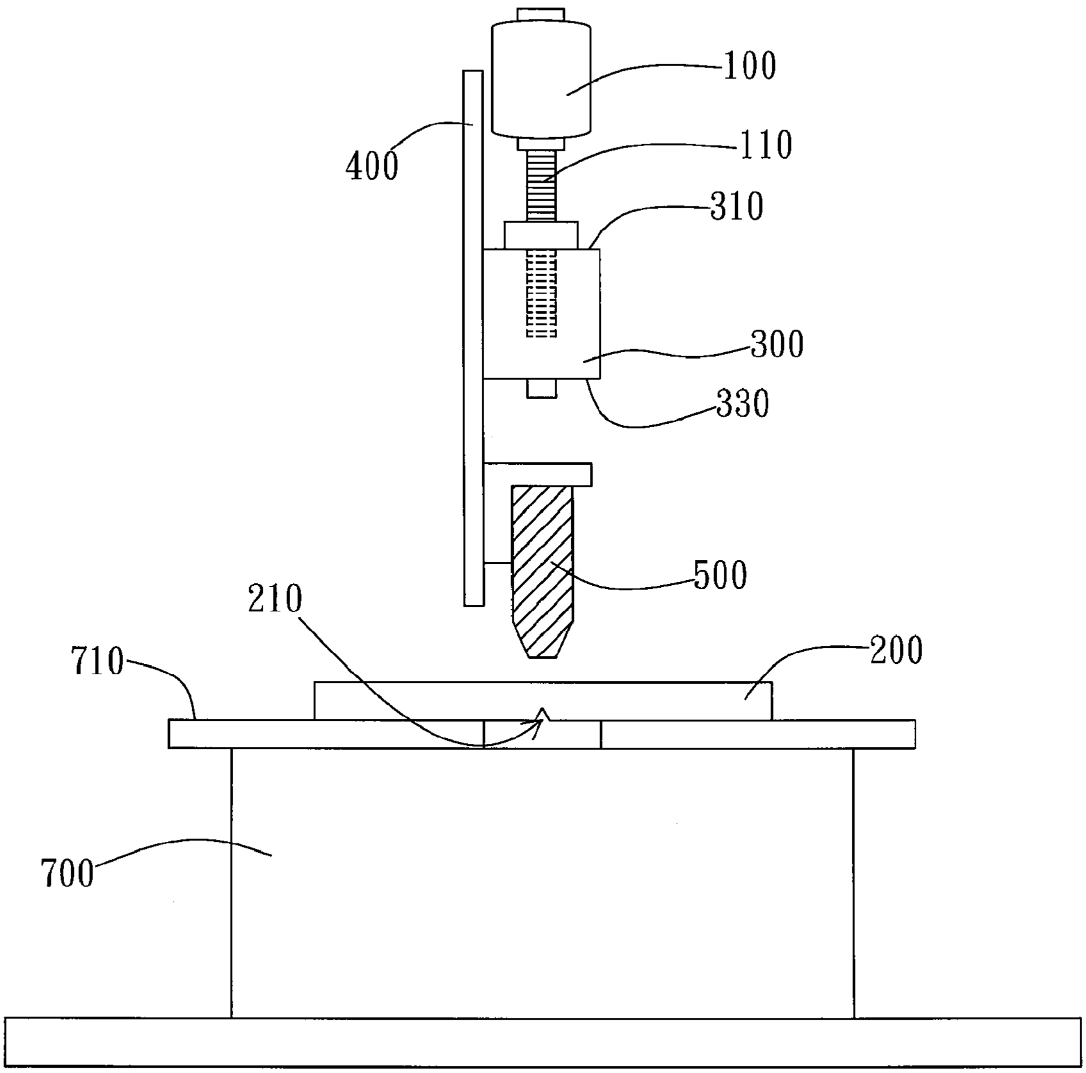
Figure 7:
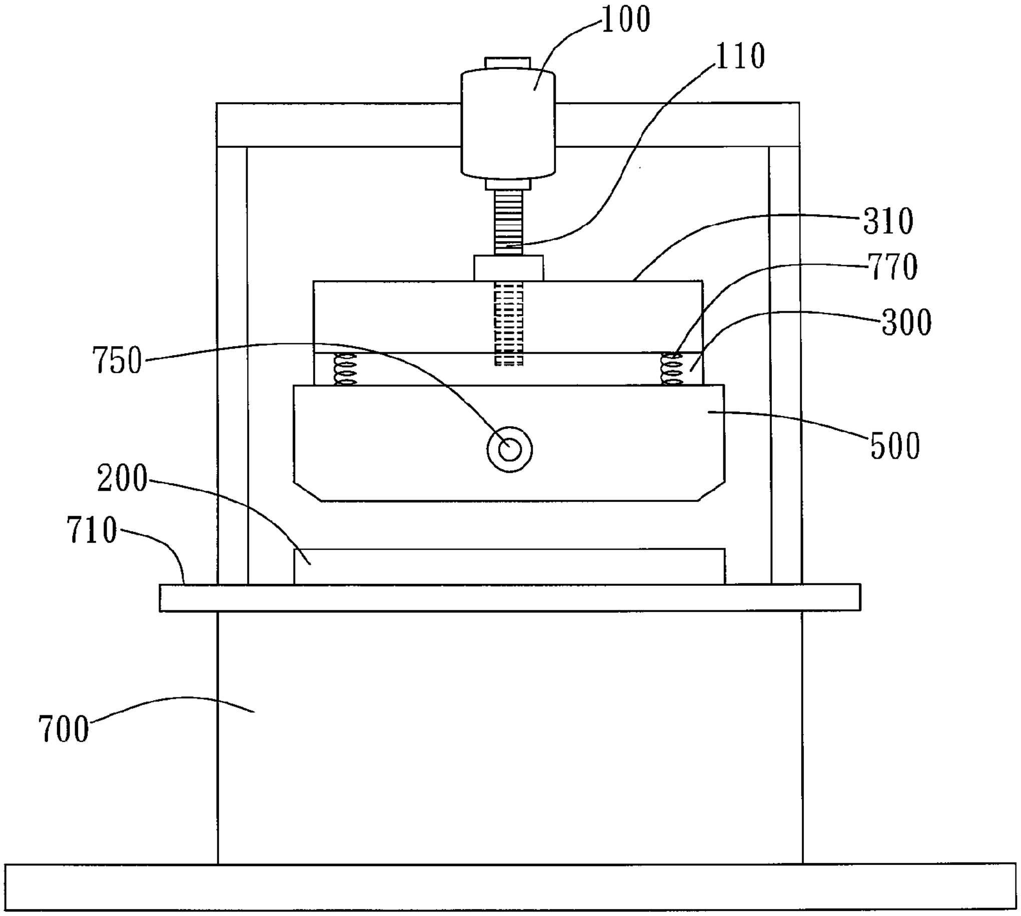
Figure 9:
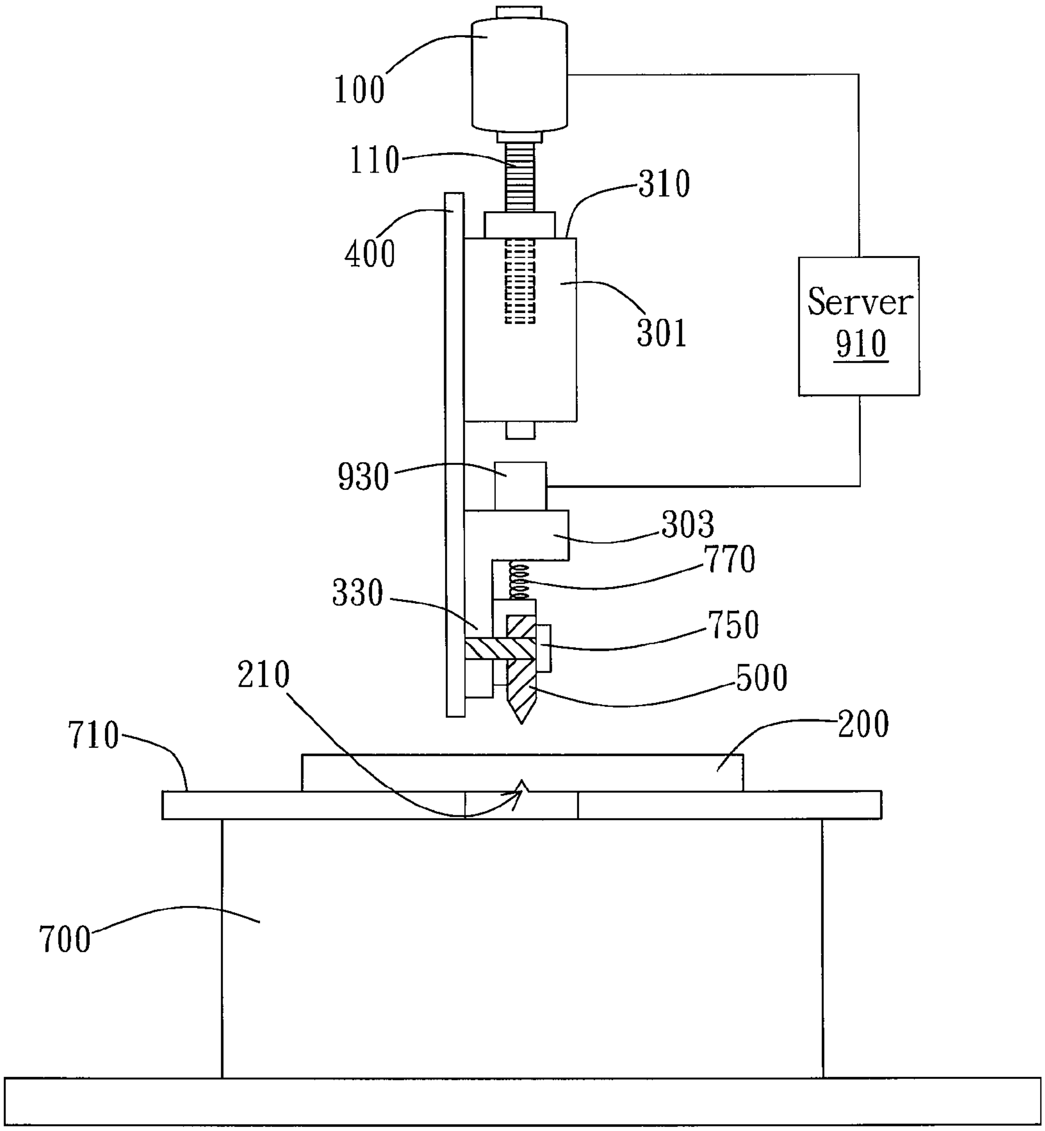
Figure 10:
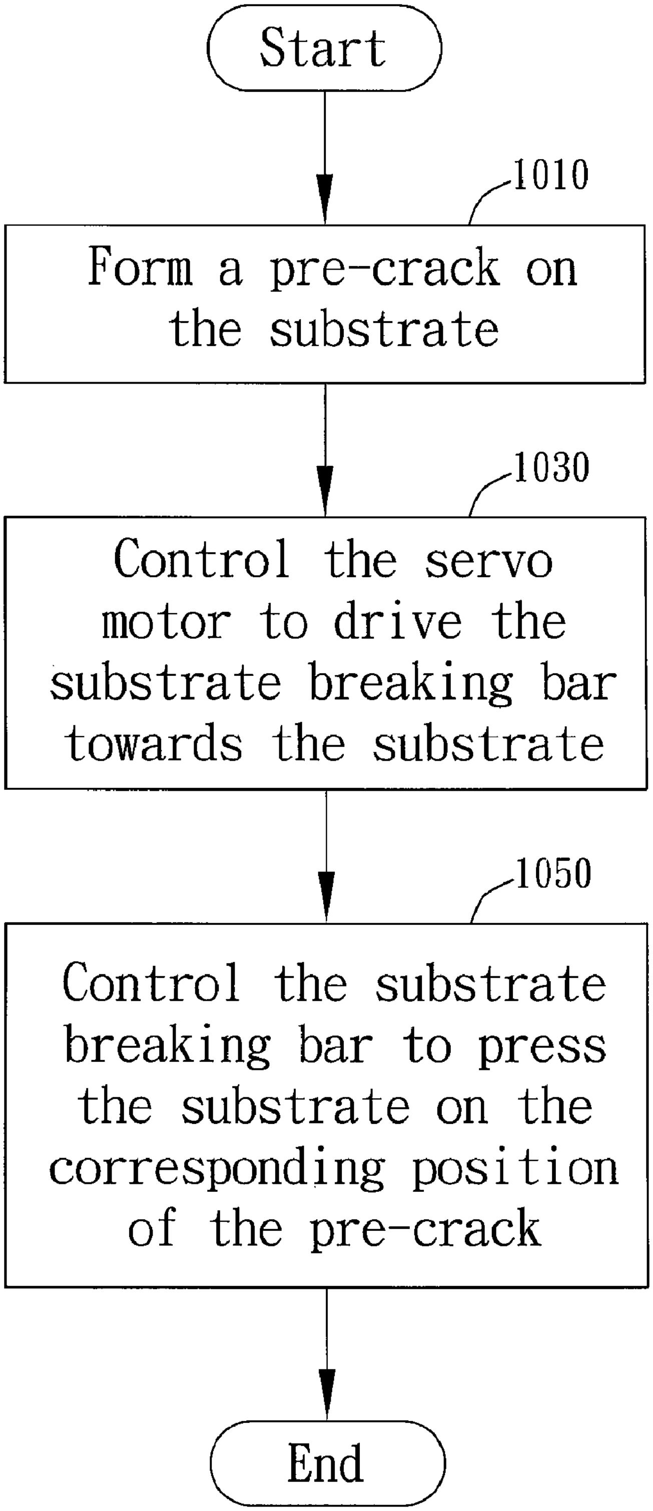
Figure 11:
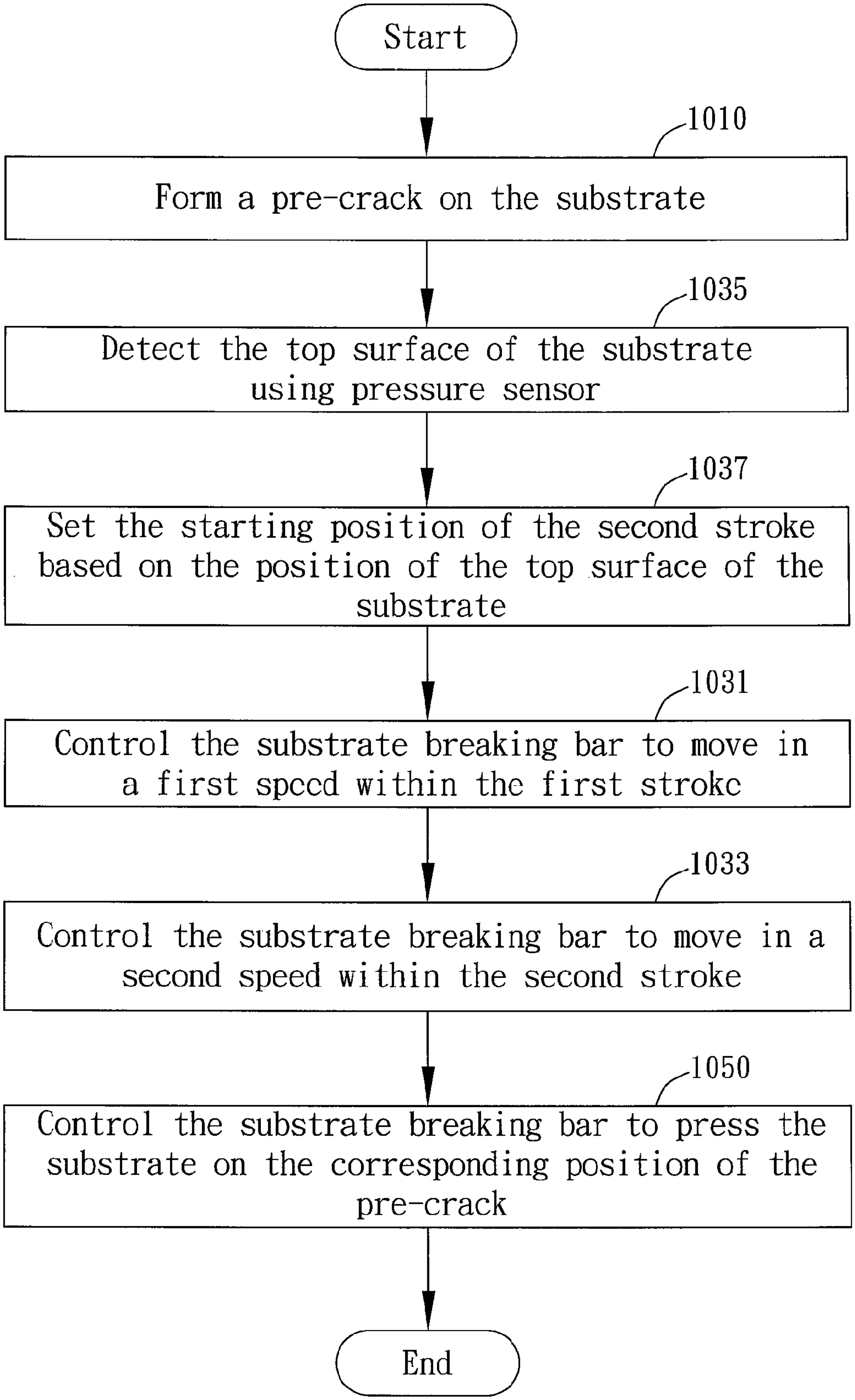
Figure 12:
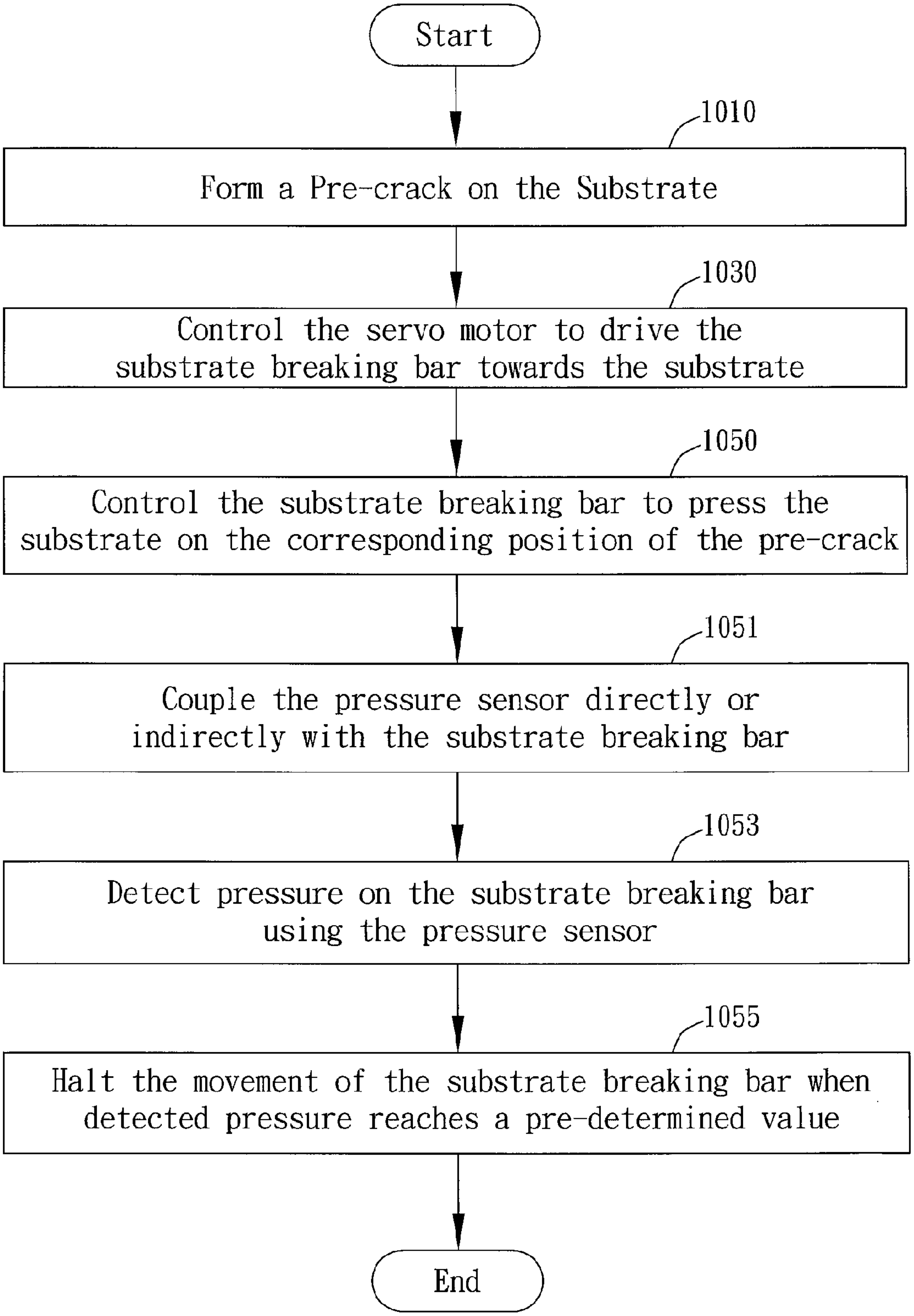

FIG. **4*a*** is a perspective diagram of an embodiment wherein the transmission device and the substrate breaking bar are separated;

FIG. **4*b* is a perspective view of the embodiment of FIG. 4*a***, when the transmission device and the substrate breaking bar make contact;

FIG. **5*a*** is a perspective view of an embodiment when the substrate breaking bar is situated in the first stroke;

FIG. **5*b*** is a perspective view of an embodiment when the substrate breaking bar is situated in the second stroke;

FIG. **6*a*** is a perspective view of an embodiment of the substrate splitting apparatus which includes a coupling shaft;

FIG. **6*b*** is perspective view of an embodiment wherein the substrate breaking bar with a coupling shaft contacts the substrate;

FIG. 7 is a perspective view of an embodiment of the present invention which includes a shock absorbing device;

FIG. **8*a*** is a perspective view of an embodiment of the present invention which includes a server and a pressure sensor;

FIG. **8*b*** is a perspective view of another embodiment of the substrate splitting apparatus having a pressure sensor;

FIG. 9 is a perspective view of another preferred embodiment of the substrate splitting apparatus having a transmission device;

FIG. 10 is a flow chart showing the steps of splitting the substrate of the present invention;

FIG. 11 is a flow chart of another embodiment showing the steps of splitting the substrate; and FIG. 12 is a flow chart of another embodiment showing the steps of splitting the substrate.

DETAILED DESCRIPTION OF THE PREFERRED EMBODIMENTS

The present invention provides a substrate splitting apparatus and a method of splitting substrate. The said substrate is suitable for the use of plane surface display. However, in different embodiments, substrates can also be used as circuit substrates, wafer substrates or other types of substrates. Furthermore, in the preferred embodiment, the material of substrates is normally glass. However, in other embodiments, the substrates can also be made of organic resin or other materials.

Figure 1:
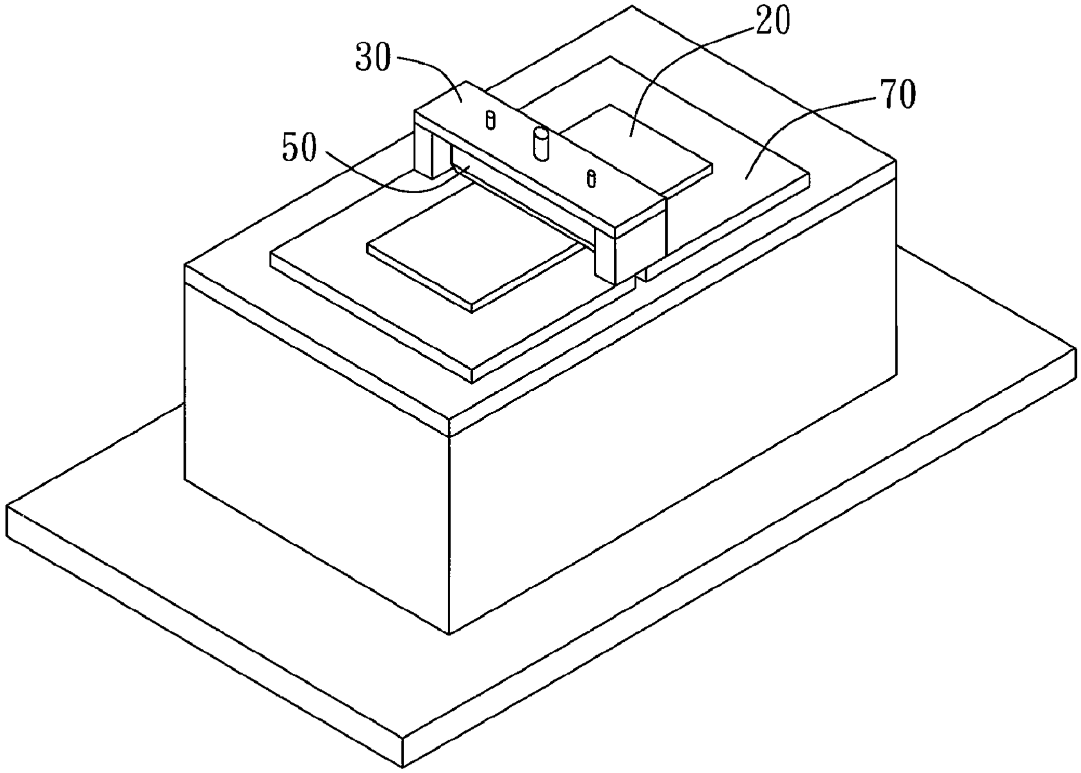
Fig. 1 (PRIOR ART)
FIG. 1 is a perspective view of a traditional substrate splitting apparatus.
Figure 2:
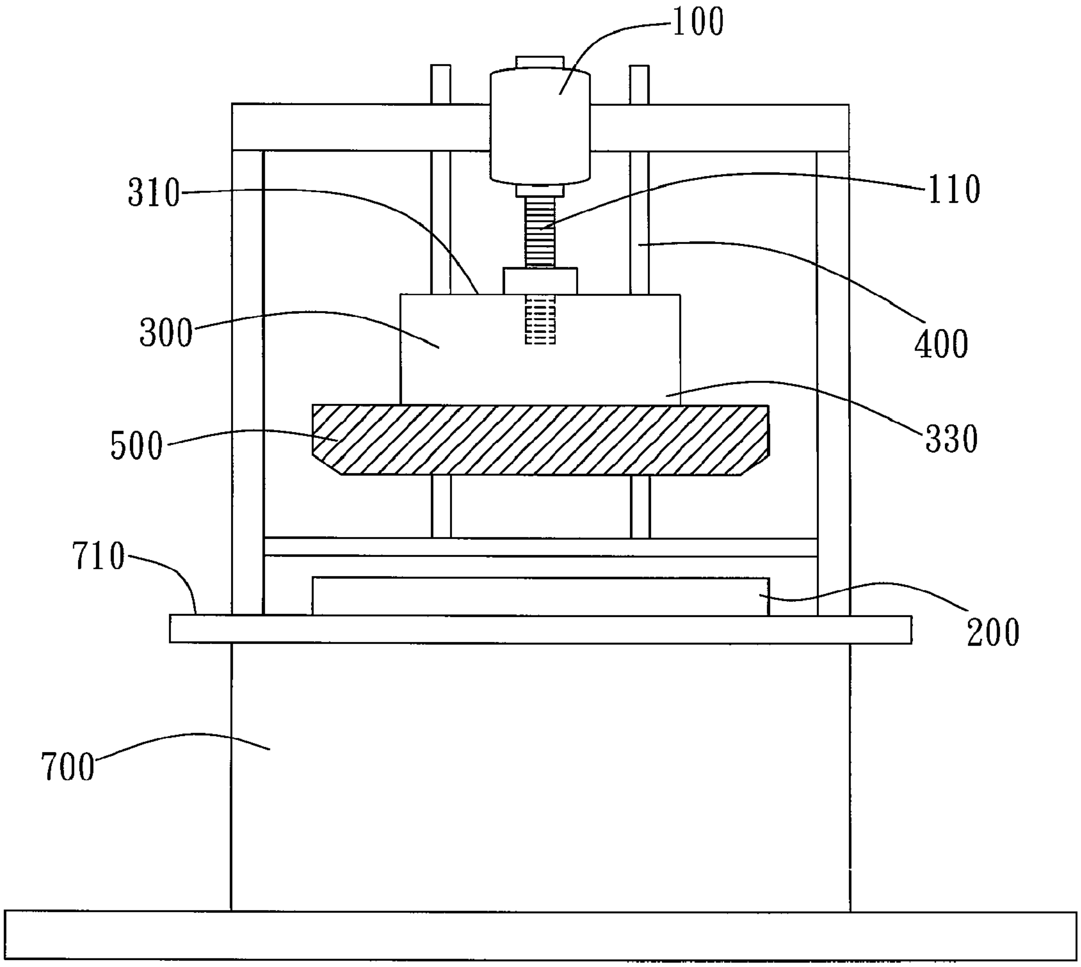
FIG. 2 is a front view of an embodiment of the substrate splitting apparatus of the present invention.

In a preferred embodiment shown in FIG. 2, a substrate splitting apparatus includes a servo motor 100, a transmission device 300, a substrate breaking bar 500 and a stage 700. The stage 700 includes a load-lock surface 710, wherein the servo motor 100, transmission device 300 and substrate breaking bar 500 are disposed above the load-lock surface 710 of the stage 700. The servo motor 100 is preferred to be selected from motors for controlling speed and drive path, such as a fixed speed servo motor, a variant speed servo motor, a direct current (DC) servo motor, an alternating current (AC) servo motor or other types of servo motors.

As FIG. 2 shows, one end of the transmission device 300 is directly or indirectly coupled with the servo motor 100 to output the power generated by the servo motor 100. In the embodiment shown in FIG. 2, the transmission device 300 has a power input terminal 310 and a power output terminal 330, wherein the power input terminal 310 is directly or indirectly coupled with the servo motor 100. The servo motor 100 includes a screw shaft 110, and the power input terminal 310 of transmission device 300 is fitted with a corresponding screw bore. The screw bore is used to accommodate the screw shaft 110. As the screw shaft 110 starts rotating, it will simultaneously restrict the power input terminal 310 from making corresponding rotation; the screw shaft 110 can also be used to drive the transmission device 300 to shift along the axial direction of the screw shaft 110.

Figure 3:
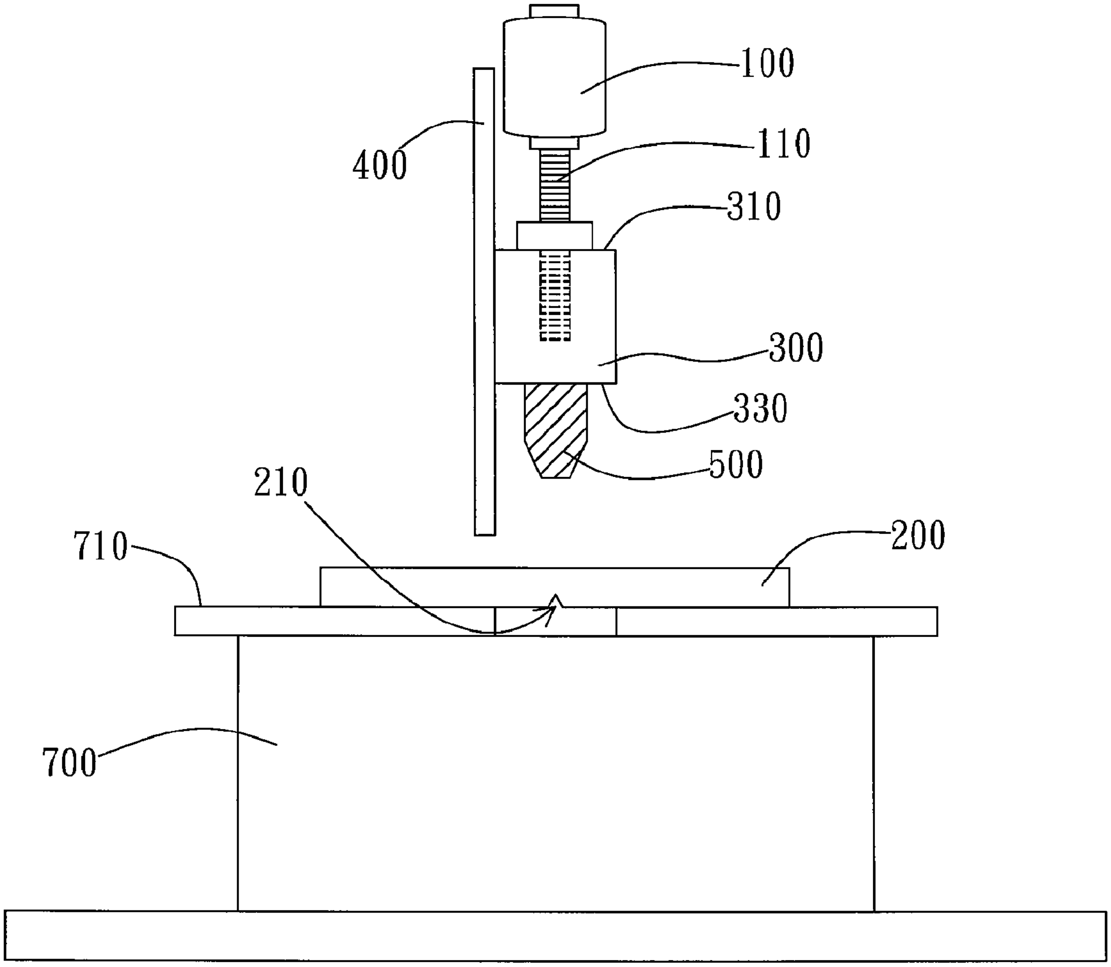
FIG. 3 is a side view of the substrate splitting apparatus illustrated in FIG. 2.

A substrate breaking bar 500 is preferred to directly or indirectly couple with the power output terminal 330 of the transmission device 300. Furthermore, the substrate breaking bar 500 can couples with the transmission device 300 in a detachable manner. That is, there is a relative shift between the substrate breaking bar 500 and the transmission device 300. As FIG. 2 and FIG. 3 show, the substrate breaking bar 500 is disposed in a longitudinal shape, and is also transverse to the load-lock surface 710. Organic resin is preferably used as the material of the substrate breaking bar 500. However, in different embodiments, the substrate breaking bar 500 can also be made of metal or other materials.

Referring to FIG. 2 and FIG. 3, the load-lock surface 710 of the stage 700 faces the substrate breaking bar 500, and the servo motor 100 uses the transmission device 300 to drive the substrate breaking bar 500 towards the load-lock surface 710. The substrate 200 is preferred to be loaded on the load-lock surface 710 via a conveyer installation (not illustrated). A pre-crack 210 is formed at the bottom of the substrate 200 by carving, piercing, laser or chemical process. The substrate breaking bar 500 extends along the pre-crack 210, and the servo motor 100 drives the substrate breaking bar 500 towards or away from the pre-crack 210.

As FIG. 2 and FIG. 3 show, the substrate breaking apparatus includes a slideway 400. The transmission device 300 and the substrate breaking bar 500 are disposed on the slideway 400. The slideway 400 is preferred to be perpendicular to the stage 700 and to the load-lock surface 710; in other words, the slideway 400 guides the transmission device 300 and the substrate breaking bar 500 to move towards or away from the load-lock surface 710. The slideway 400 also prevents the transmission device 300 and the substrate breaking bar 500 from moving or rotating in any other direction. The slideway 400 is disposed above the stage 700. However, in other embodiments, the slideway 400 may also be suspended above the load-lock surface 710.

Figure 4B:
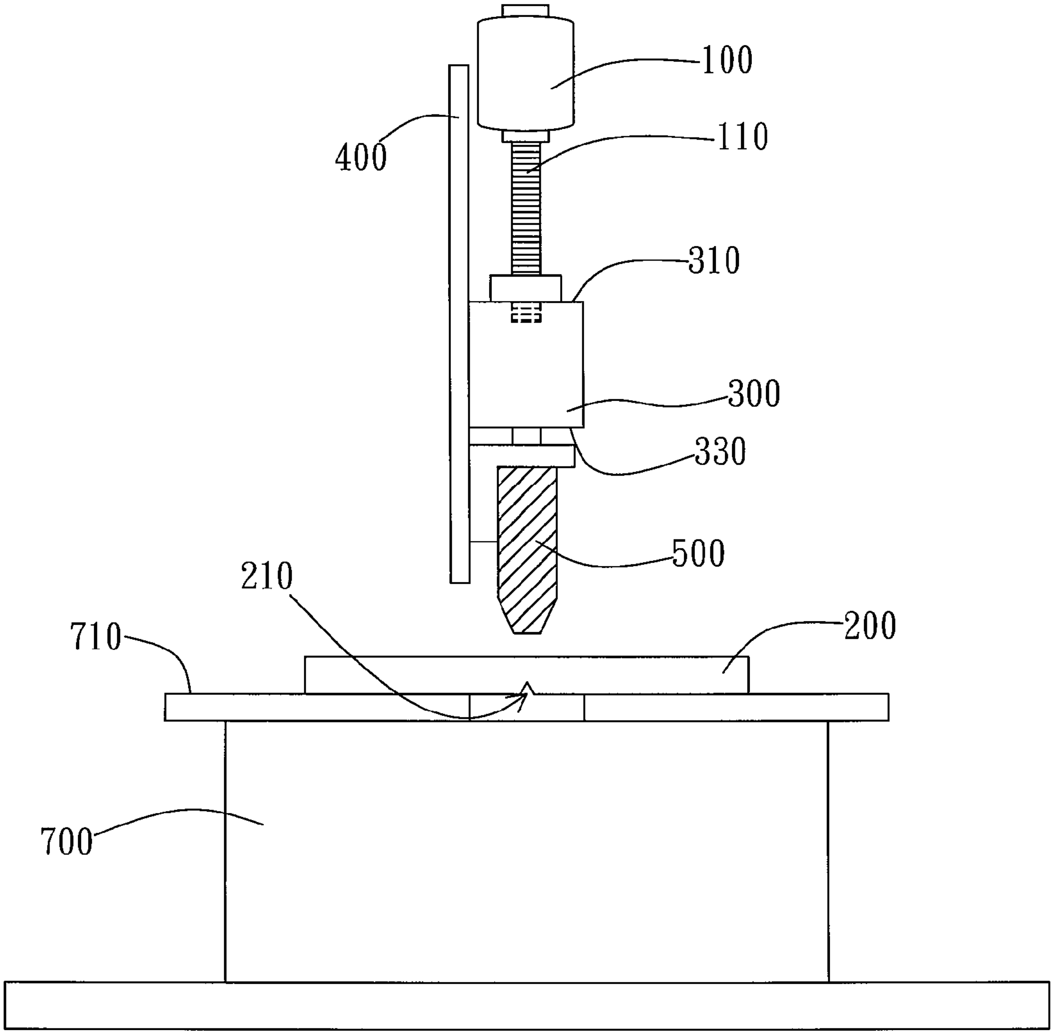

In an embodiment shown in FIG. 4*a*, the transmission device 300 and the substrate breaking bar 500 may move relative to each other along the slideway 400. In other words, the transmission device 300 couples with the substrate breaking bar 500 in a detachable manner. As FIG. 4*b* shows, when the transmission device 300 is driven by the servo motor 100, and comes into contacts with the substrate breaking bar 500 along the slideway 400, the power output terminal 330 of the transmission device will then move the substrate breaking bar 500 towards the load-lock surface 710.

Figure 5A:
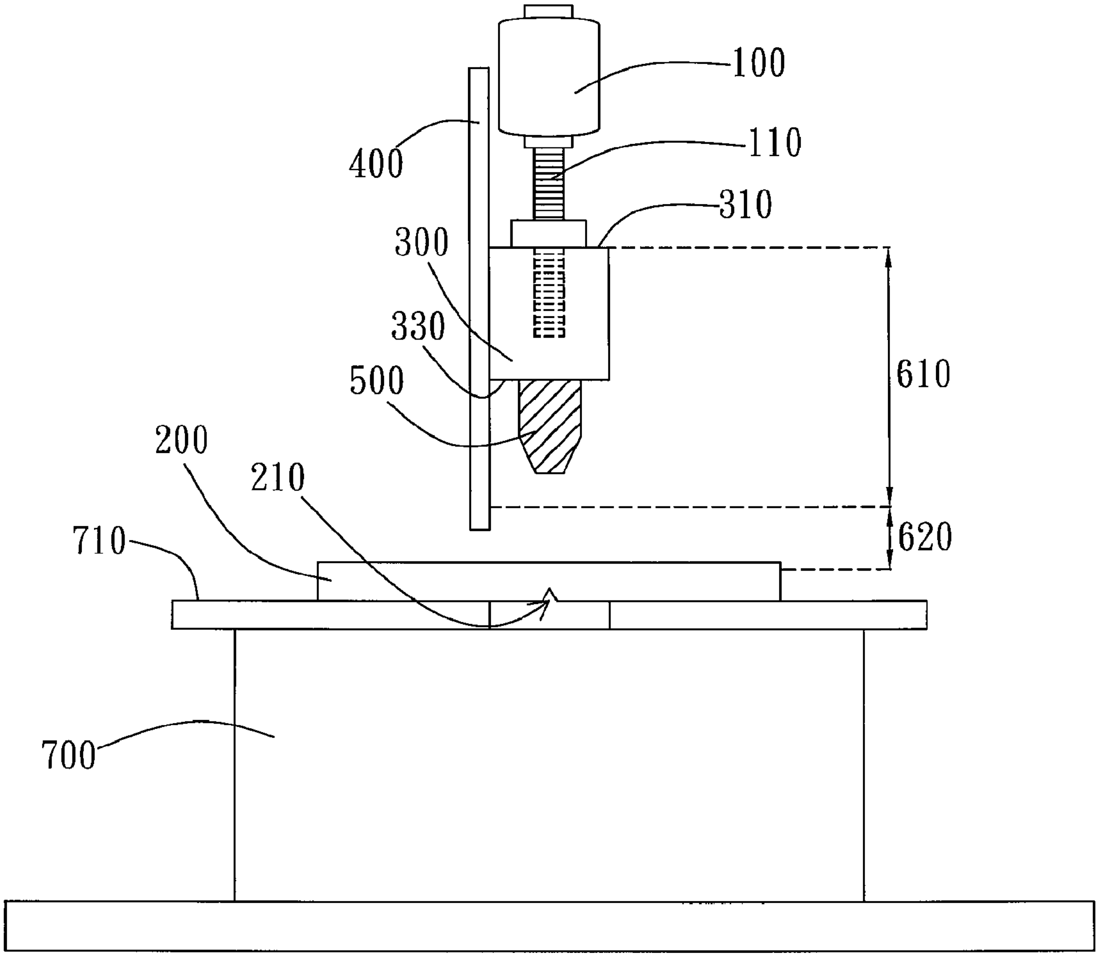

As FIG. 5*a* shows, the substrate breaking bar 500 has in a first stroke 610 and a second stroke 620 with reference to the bottom of substrate breaking bar 500. The second stroke 620 is closer to the load-lock surface 710 than the first stroke 610. As FIG. 5*a* shows, the substrate breaking bar 500 has to start moving from the first stroke 610, and then moves into the second stroke 620, then substrate breaking bar 500 is able to draw near the load-lock surface 710 and makes contact with the substrate 200 disposed on the load-lock surface 710. In a more preferred embodiment, the distance from the initial position of the second stroke 620 to the surface of the substrate 200 is less than 2 mm. In other words, the distance from the load-lock surface 710 to the initial position of the second stroke 620 is less than the sum of 2 mm and the thickness of the substrate 200. The initial position of the second stroke 620 is also the end position of the first stroke 610. In a more preferred embodiment, the substrate breaking bar 500 reaches the initial position of the second stroke 620, when it has completed the deceleration process from a first speed to a second speed. The second speed is less than the first speed.

Figure 5B:
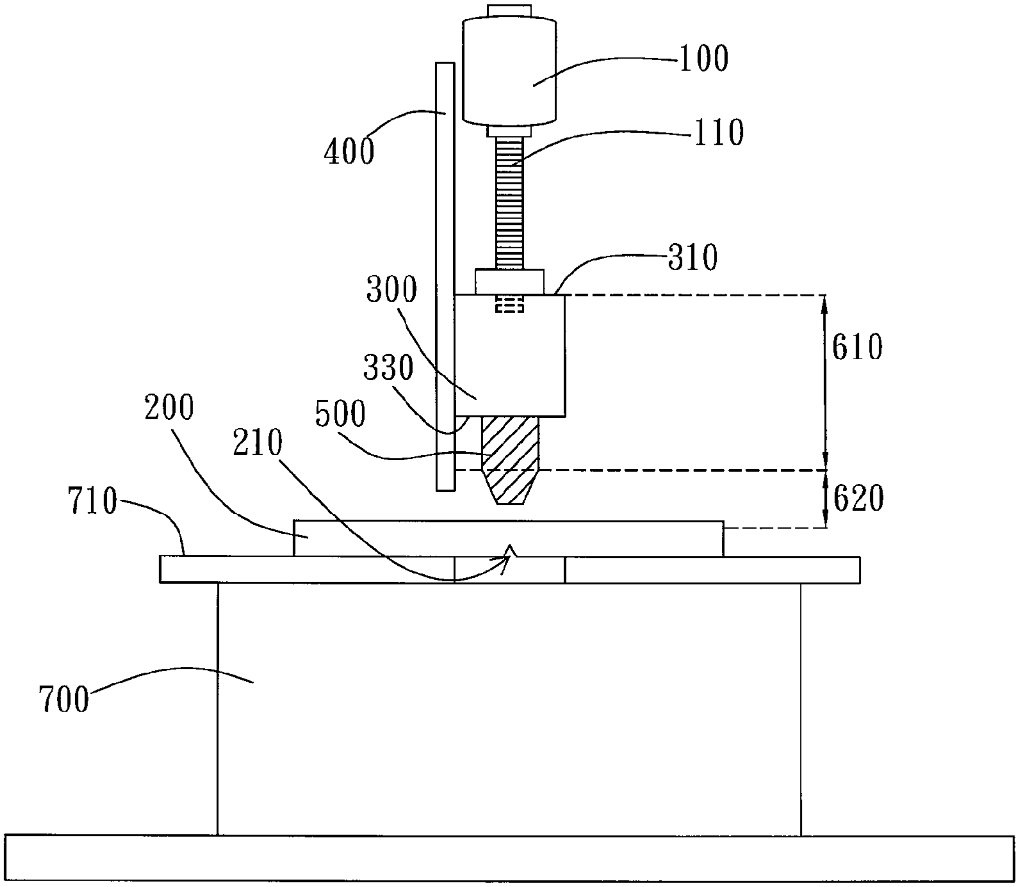

As FIG. 5*a* shows, within the first stroke 610, the servo motor 100 drives the substrate breaking bar 500 to move in the first speed. As FIG. 5*b* shows, within the second stroke 620, the servo motor 100 drives the substrate breaking bar 500 to move in the second speed. In this embodiment, the first speed is greater than the second speed in order to save the overall production time. However, in different embodiments, the servo motor 100 may drive the substrate breaking bar 500 to move in a fixed speed. The second speed is preferred to be less than 10 mm/s. However, in a more preferred embodiment, the second speed is less than 2 mm/s. When the substrate breaking bar 500 moves in the second speed and contacts the substrate 200, the slow-pressing effect of the substrate breaking bar 500 will be able to split the substrate 200 at the pre-crack 210 and still maintains the structure strength of edges after splitting. For thinner substrate 200, the substrate breaking bar 500 needs to press the substrate 200 with the slower second speed. For example, if the thickness of substrate 200 is less than 0.3 mm, the second speed is preferred to be less than 2 mm/s.

Figure 6A:
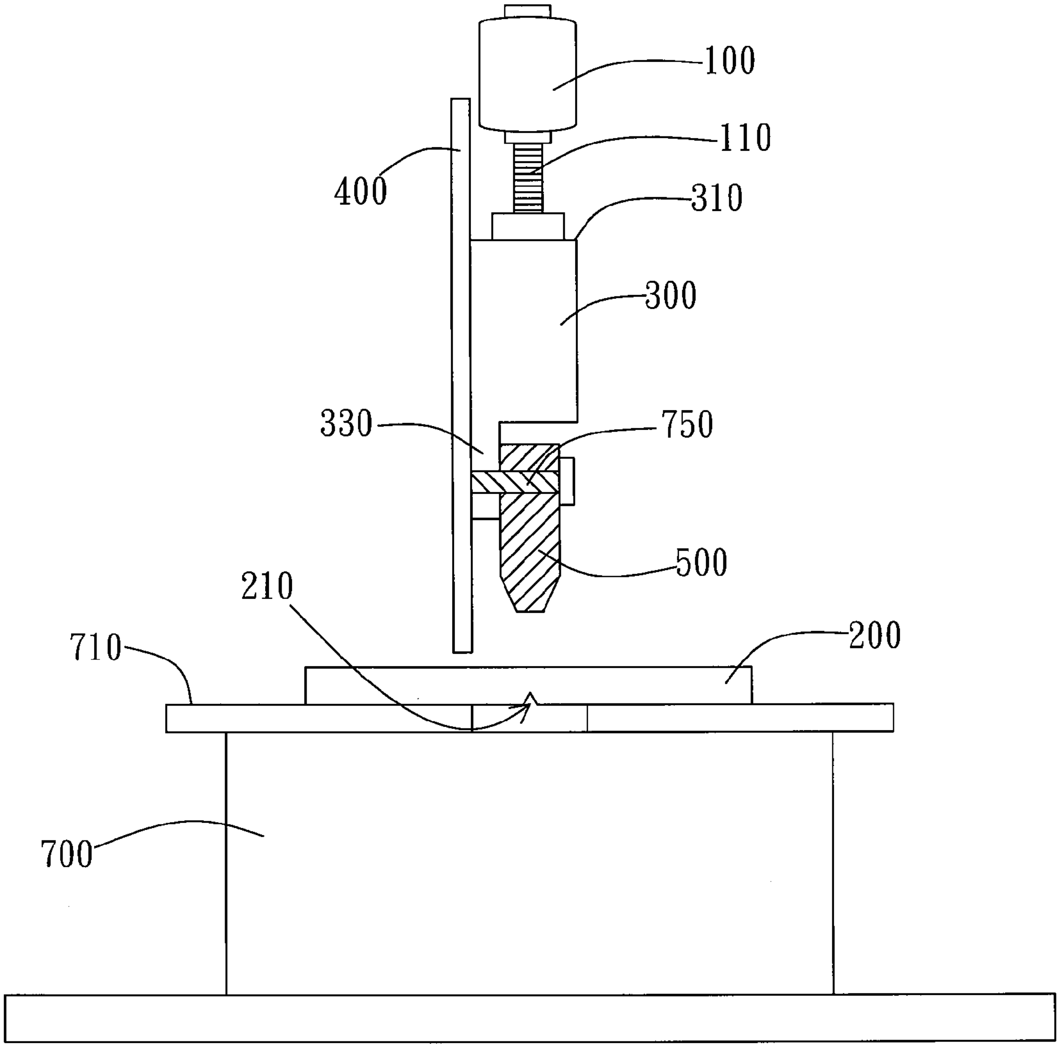
Figure 6B:
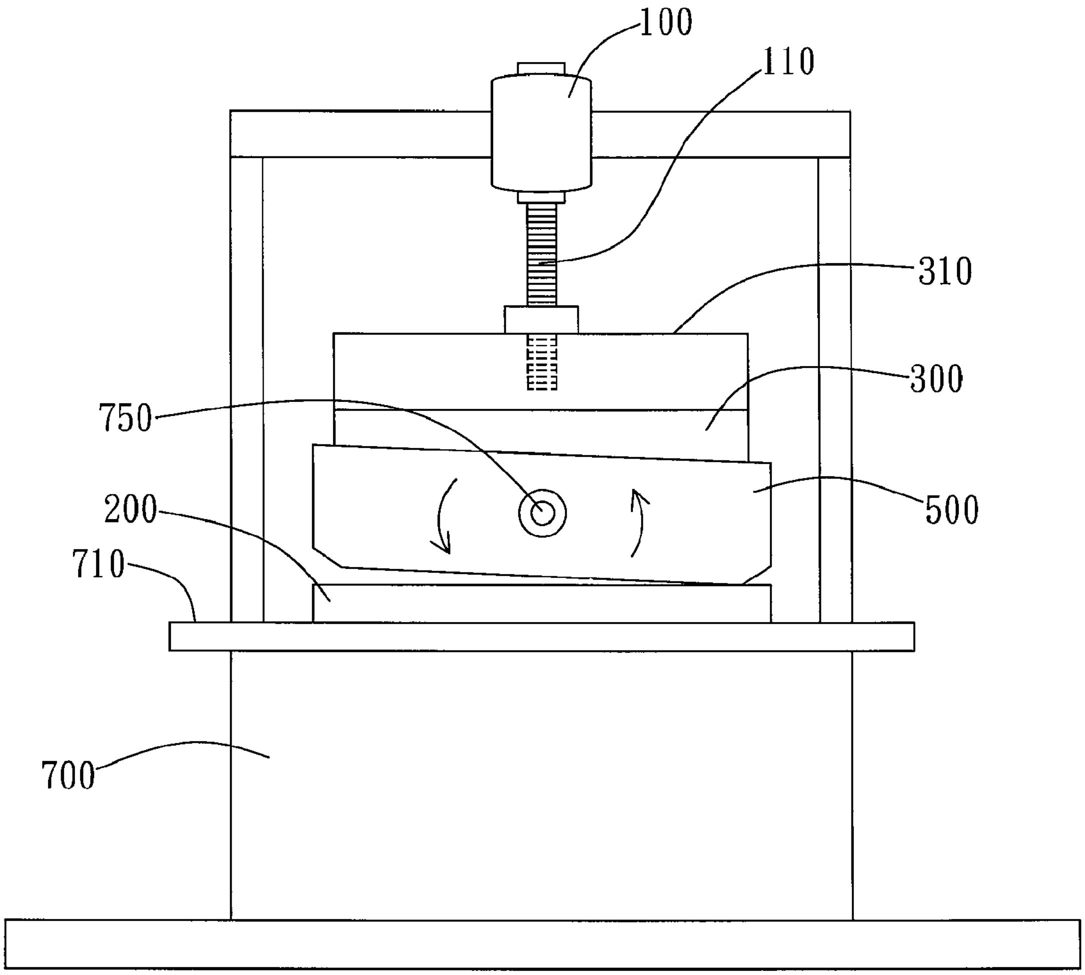

In an embodiment shown in FIG. 6*a* and FIG. 6*b*, the substrate breaking apparatus includes a coupling shaft 750.

The transmission device 300 pivotally connects with a mid section of the substrate breaking bar 500 via the coupling shaft 500; and the coupling shaft 750 is perpendicular to the moving direction of the transmission device 300. In this embodiment, the coupling shaft 750 is transverse to the substrate breaking bar 500, and is also parallel to the load-lock surface 710. As FIG. 6*b* shows, when the substrate breaking bar 500 comes into contact with the substrate 200, the substrate breaking bar 500 may not be in parallel with the surface of the substrate 200 because of the uneven thickness of the substrate 200 or other possible reasons. The coupling shaft 750 then causes the substrate breaking bar 500 to slightly rotate, until the substrate breaking bar 500 is in parallel with the surface of the substrate 200 to avoid the product yield loss due to the stress concentration.

In an embodiment shown in FIG. 7, the substrate splitting apparatus further includes a shock absorbing device 770. The shock absorbing device 770 is disposed on an outer side of the coupling shaft 750; in other words, the shock absorbing device 770 and the coupling shaft 750 are disposed along different axes. The shock absorbing device 770 is disposed between the transmission device 300 and the substrate breaking bar 500. When the substrate breaking bar 500 rotates with respect to the coupling shaft 750, the shock absorbing device 770 absorbs the energy generated by the rotation, and also decreases the velocity of the substrate breaking bar. In a more preferred embodiment, a pair of the shock absorbing devices 770 are disposed on two sides of the coupling shaft 750. However, in different embodiments, the shock absorbing devices 770 can also be disposed on only one side of the coupling shaft. Furthermore, the shock absorbing device 770 is preferred to include a damping device to transform the kinetic energy generated by the substrate breaking bar 500. The shock absorbing device 770 may also include elastic components such as a spring.

Figure 8A:
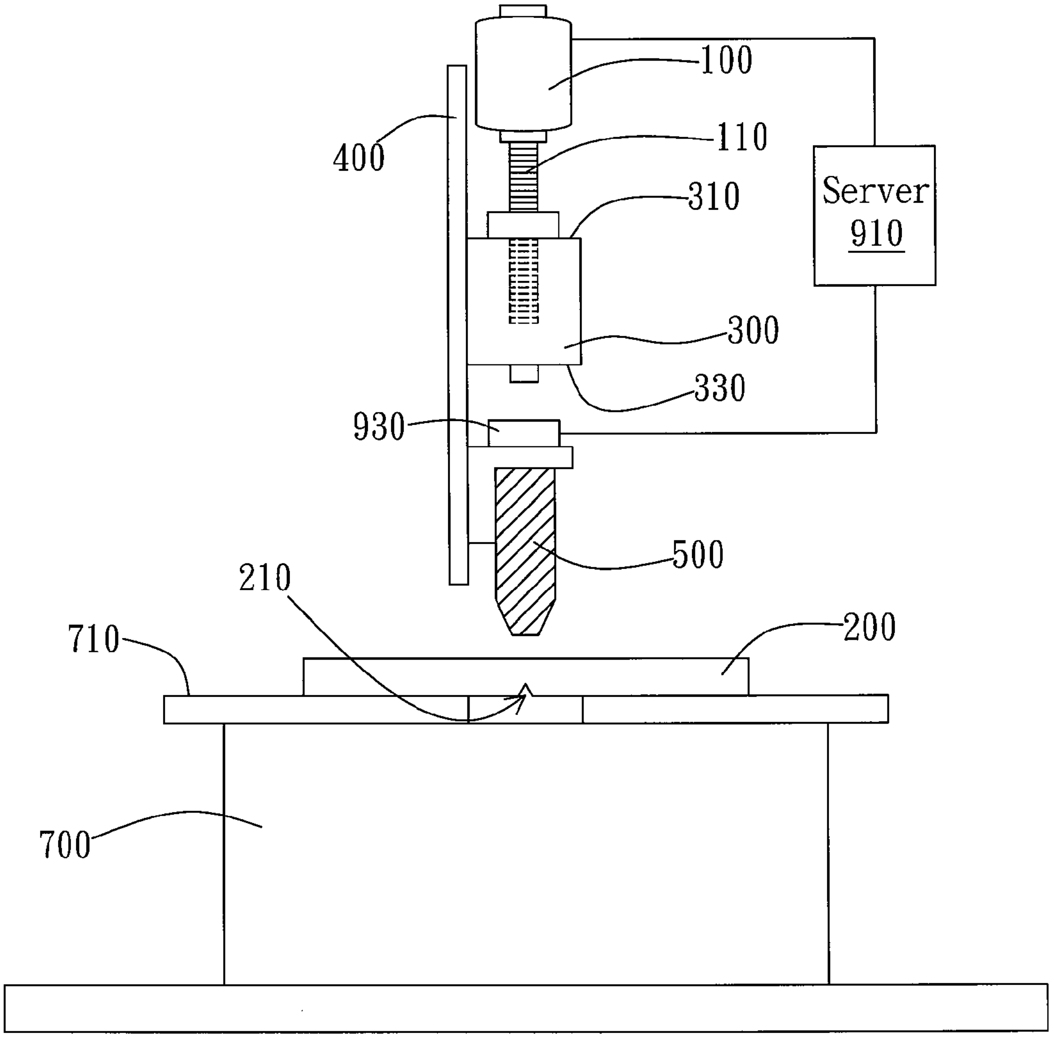
Figure 8B:
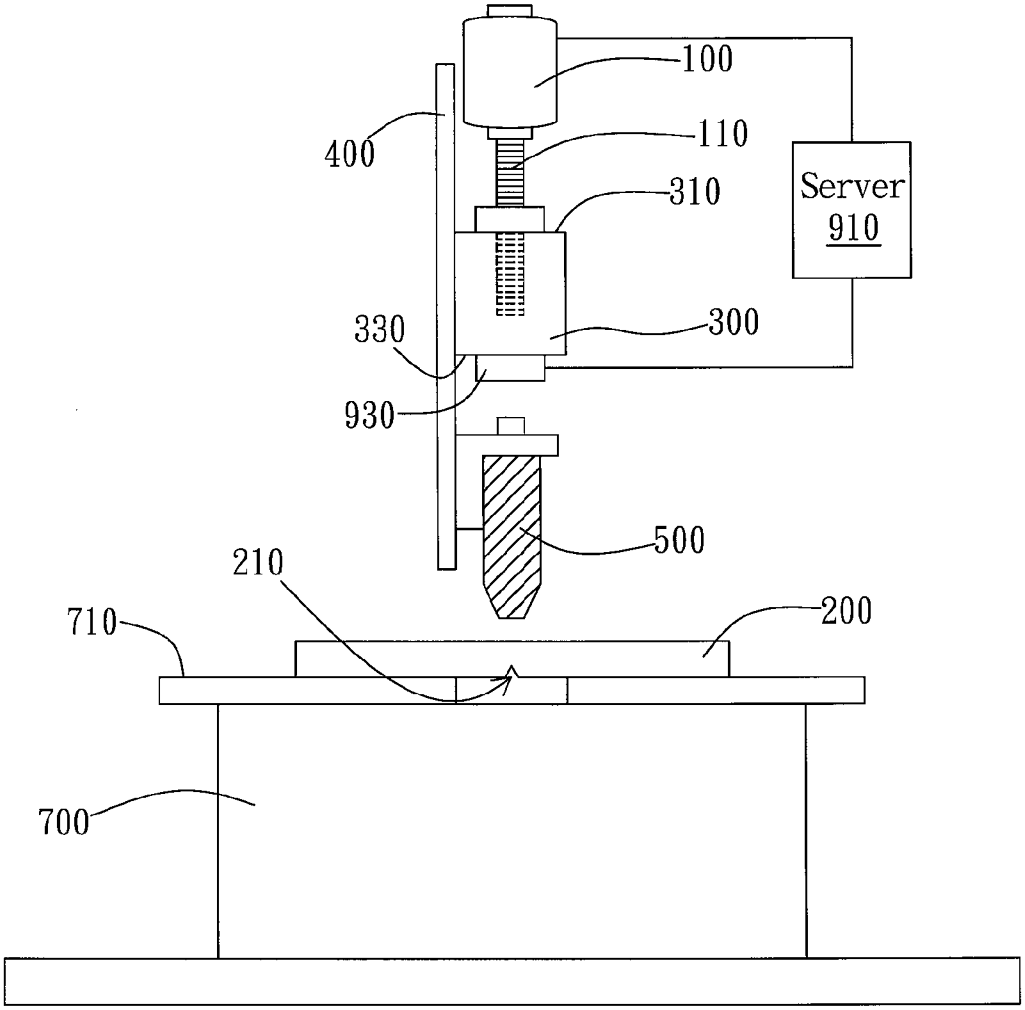

As FIG. 8*a* shows, the substrate splitting apparatus includes a server 910 and a pressure sensor 930. The server 910 is electrically coupled with the servo motor 100 and controls the output power and the speed of the servo motor 100. The pressure sensor 930 is directly or indirectly coupled with the substrate breaking bar 500, and is electrically coupled with the server 910. In the embodiment shown in FIG. 8*a*, the pressure sensor 930 is disposed on top of the substrate breaking bar 500 and corresponds to the power output terminal 330 of the transmission device 300. The transmission device 300 has to first press the pressure sensor 930, before the power output terminal 330 can make contact with the substrate breaking bar 500. The pressure sensor 930 then couples with the substrate breaking bar 500 in series and detects the pressure exerted on the substrate breaking bar 500. However, in different embodiments, as FIG. 8*b* shows, the pressure sensor 930 can also be disposed on power output terminal 330 of the transmission device 300. As the power output terminal 330 presses the substrate breaking bar 500, the pressure sensor 930 also detects the pressure exerted on the substrate breaking bar 500. The pressure sensor 930 can also couple with the substrate breaking bar 500 in a parallel manner.

In an embodiment shown in FIG. 9, the transmission device 300 includes a separated power input section 301 and a power output section 303. The power input section 301 is movably coupled with the servo motor 100, and the power input terminal 310 of the transmission device 300 is disposed on the power input section 301. The power input section 303 moves together with the substrate breaking bar 500, and thus the substrate breaking bar 500 couples with the power output section 303 via the coupling shaft 750. The shock absorbing device 770 is disposed in the space between the power output section 303 and the substrate breaking bar 500. The power input section 301 and the power output section 303 are preferred to be disposed along the slideway 400, and to generate displacements perpendicular to the load-lock surface 710.

As FIG. 9 shows, the pressure sensor 930 is disposed between the power input section 301 and the power output section 303 as well as above the power output section 303. However, in different embodiments, the pressure sensor 930 may be disposed on the power input section 301 while indirectly coupled with the substrate breaking bar 500. In the embodiment shown in FIG. 9, the servo motor 100 drives power output section 303 to move the pressure sensor 930. The pressure sensor 930 can then detect the pressure exerted on the substrate breaking bar 500.

In the embodiment shown in FIG. 10, the preferred method of splitting a substrate 200 includes step 1010 of forming a pre-crack 210 on the substrate 200. Methods of forming a pre-crack 210 include carving, piercing, laser or chemical process. Step 1030 includes controlling the servo motor 100 to drive the substrate breaking bar 500 towards the substrate 200. In a more preferred embodiment, the rotation power from the servo motor 100 is transformed, by the transmission device 300, into linear power to drive the substrate breaking bar 500. Step 1050 includes controlling of the substrate breaking bar 500 to press the substrate 200 at the location corresponding to the pre-crack 210. The orientation of the substrate breaking bar 500 is preferred to be in parallel with the orientation of the pre-crack 210. Furthermore, it is more preferred to form the pre-crack 210 at the bottom of the substrate 200 with the substrate breaking bar 500 pressing on the top surface of the substrate 200. In this way the substrate breaking bar is preferred to press on the side of the substrate 200 opposite to the pre-crack 210.

In an embodiment shown in FIG. 11, the step of controlling the servo motor 100 includes step 1031 of moving the substrate breaking bar 500 in a first speed, when the substrate breaking bar 500 is situated in the first stroke 610; and also includes step 1033 controlling the substrate breaking bar 500 to move in the second speed, when the substrate breaking bar 500 is situated in the second stroke 620. The second stroke 620 is closer to the substrate 200 than the first stroke 610 and the first speed is greater than the second speed. However, in different embodiments, the servo motor 100 may also control the substrate breaking bar 500 to move in a fixed speed. The second speed is preferred to be less than 10 mm/s. However, in a more preferred embodiment, the second speed is preferred to be less than 2 mm/s. When the slower second speed is used as the contact speed with the substrate 200. The slow-pressing effect of the substrate breaking bar 500 will split the substrate 200 at the pre-crack 210, and still maintains the structure strength of edges of the substrate 200. As for the thinner substrate 200, the substrate breaking bar 500 needs to press the substrate 200 with the slower second speed. For example, if the thickness of substrate 200 is less than 0.3 mm, the second speed is preferred to be less than 2 mm/s.

As FIG. 11 shows, steps of controlling the servo motor 100 can also include the step 1035 of detecting the position of the top surface of the substrate 200 using the pressure sensor 930. Step 1035 starts when the first substrate 200 is loaded from a batch of substrates 200. In step 1035, the servo motor 100 drives the substrate breaking bar 500 downwards to make contact with the substrate 200. The position where the pressure sensor 930 starts detecting pressure exerted on the substrate breaking bar 500 can be defined as the bottom surface of the substrate breaking bar 500, as well as the top surface of the substrate 200. Step 1037 includes determining the initial position of the top surface of the second stroke, based on the position of top surface of the substrate 200. In a more preferred embodiment, the distance between the initial position of the second stroke 620 and the top surface of the substrate 200 is less than 2 mm. Furthermore, the step 1035 and the step 1037 can be omitted in an embodiment shown in FIG. 11. The positioning of the top surface or the substrate 200 and that of the initial position of the second stroke 620 can be done by manually configuring the server 910 to control the servo motor 100.

In an embodiment shown in FIG. 12, step 1050 of pressing the substrate 200 includes step 1051 of disposing the pressure sensor 930 to directly or indirectly couple with the substrate breaking bar 500. The pressure sensor 930 and the substrate breaking bar 500 can be coupled together in series or in parallel. The step 1053 includes detecting the pressure exerted on the substrate breaking bar using the pressure sensor 930. This detected pressure is created by the reverse force from the substrate breaking bar 200, in response to the pressing of the substrate breaking bar 500. Consequently as the pressing force from the substrate breaking bar 500 increases, the pressure exerted on the substrate breaking bar 500 also increases.

The step 1055 includes halting the displacement of the substrate breaking bar 500, when the pressure exerted on the substrate breaking bar reaches a pre-determined value. The thickness of the substrate 200 and the depth of the pre-crack 210 can be preset. Experiments and other analytical skills can be used to determine the pressure needed to split the substrate 200 at the pre-crack 210. This pressure value can then be set at the server 910 as the pre-determined pressure. Once the pressure sensor 930 has detected that the pressure on the substrate breaking bar 500 reaches the pre-determined value; the substrate 200 can be regarded as effectively split. At that moment, the server 910 will control the servo motor 100 to stop outputting power or to output power in a reverse direction, in order to halt the advance of the substrate breaking bar 500.

The method of splitting substrate 200 may also includes disposing a shock absorbing device 770 between the transmission device 300 and the substrate breaking bar 500. The shock absorbing device 770 absorbs the vibration created by contacts between the substrate breaking bar 500 and the substrate 200. Furthermore, the shock absorbing device 770 can also be used to pivotally couple the coupling shaft 750 with the substrate breaking bar 500. If the substrate breaking bar 500 and the substrate 200 are not in parallel, the coupling shaft 750 will rotate the substrate breaking bar 500 to average the stress distribution on the surfaces of the substrate breaking bar 500 and the substrate 200, in order to improve the quality of manufactured product.

The above is a detailed description of the particular embodiment of the invention which is not intended to limit the invention to the embodiment described. It is recognized that modifications within the scope of the invention will occur to a person skilled in the art. Such modifications and equivalents of the invention are intended for inclusion within the scope of this invention.

What is claimed is:

1. A substrate splitting apparatus comprising:

a servo motor;

a transmission device with an end coupled with the servo motor, wherein the transmission device outputs power generated from the servo motor;

a substrate breaking bar coupled with the transmission device;

a stage located under the transmission device and the substrate breaking bar, wherein the stage has a load-lock surface corresponding to the substrate breaking bar and the servo motor drives the transmission device to move the substrate breaking bar towards the load-lock surface;

a server electrically coupled with the servo motor; and a pressure sensor coupled with the substrate breaking bar and electrically coupled with the server;

wherein the pressure sensor detects a pressure exerted on the substrate breaking bar.

2. The substrate splitting apparatus of claim 1, wherein the servo motor includes a screw shaft, the transmission device includes:

a power input terminal coupled with the screw shaft and having a screw bore disposed to accommodate the screw shaft; and a power output terminal disposed to correspondingly drive the substrate breaking bar to shift.

3. The substrate splitting apparatus of claim 1 further comprising a slideway, wherein the transmission device and the substrate breaking bar are disposed along the slideway, and the slideway guides the transmission device and the substrate breaking bar to move towards or away from the load-lock surface.

4. The substrate splitting apparatus of claim 1, wherein the substrate breaking bar has a first and a second stroke relative to the load-lock surface, the second stroke is closer to the load-lock surface than the first stroke, within the first stroke the servo motor drives the substrate breaking bar to move in a first speed, within the second stroke the servo motor drives the substrate breaking bar to move in a second speed, and the first speed is greater than the second speed.

5. The substrate splitting apparatus of claim 4, wherein the distance between an initial position of the second stroke and the load-lock surface is less than a sum of 2 mm and the thickness of a substrate.

6. The substrate splitting apparatus of claim 4, wherein the second speed is less than 10 mm/s.

7. The substrate splitting apparatus of claim 4, wherein the second speed is less than 2 mm/s.

8. The substrate splitting apparatus of claim 1 further comprising a coupling shaft, wherein the transmission device is pivotally connected to a mid section of the substrate breaking bar via the coupling shaft, and the coupling shaft is perpendicular to the moving direction of the transmission device.

9. The substrate splitting apparatus of claim 8 further comprising a shock absorbing device disposed on an outer side of the coupling shaft, wherein the shock absorbing device is disposed between the transmission device and the substrate breaking bar.

10. The substrate splitting apparatus of claim 9, wherein the shock absorbing device includes a damping device.

11. The substrate splitting apparatus of claim 1, wherein the pressure sensor couples with the substrate breaking bar in parallel.

12. The substrate splitting apparatus of claim 1, wherein the pressure sensor couples with the substrate breaking bar in series.

13. The substrate splitting apparatus of claim 12, wherein the transmission device includes:

a power output section coupled to the servo motor; and a power input section moving together with the substrate breaking bar; wherein the pressure sensor is disposed between the power output section and the power input section, the power input section moves the pressure sensor to drive the power output section.

14. The substrate splitting apparatus of claim 12, wherein the pressure sensor is disposed between the transmission device and the substrate breaking bar, the power input section moves the pressure sensor to drive the substrate breaking bar.

15. A substrate splitting method comprising the following steps:

forming a pre-crack on a substrate;

controlling a servo motor to drive a substrate breaking bar towards the substrate, wherein this step of controlling the server motor further comprises:

controlling the substrate breaking bar to move in a first speed within a first stroke; and controlling the substrate breaking bar to move in a second speed within a second stroke, wherein the second stroke is closer to the substrate than the first stroke, and the first speed is greater than the second speed; and controlling the substrate breaking bar to press the substrate at the pre-crack.

16. The substrate splitting method of claim 15, wherein the second speed is less than 10 mm/s.

17. The substrate splitting method of claim 16, wherein the second speed is less than 2 mm/s.

18. The substrate splitting method of claim 15, wherein the step of controlling the servo motor includes:

detecting a position of a top surface of the substrate with a pressure sensor; and determining an initial position of the second stroke based on the position of a top surface of the substrate.

19. The substrate splitting method of claim 15 further comprising disposing a shock absorbing device between the transmission device and the substrate breaking bar to absorb the vibration generated when the substrate breaking bar contacts the substrate.

20. The substrate splitting method of claim 15 further comprising pivotally connecting a coupling shaft with the substrate breaking bar to average the stress distribution created by contact between the substrate breaking bar and the substrates.

21. The substrate splitting method of claim 15, wherein the step of pressing the substrate pressing includes:

disposing a pressure sensor to couple with the substrate breaking bar;

detecting a pressure exerted on the substrate breaking bar by using the pressure sensor; and halting advance of the substrate breaking bar when the pressure exerted on the substrate breaking bar reaches a pre-determined pressure value.

22. The substrate breaking method of claim 21 further comprising coupling the pressure sensor with the substrate breaking bar in series.

23. The substrate splitting method of claim 21 further comprising coupling the pressure sensor with the substrate breaking bar in parallel.

24. The substrates splitting method of claim 15 further comprising limiting the thickness of the substrate to be less than 0.3 mm.

25. A substrate splitting apparatus comprising:

a servo motor;

a transmission device with an end coupled with the servo motor, wherein the transmission device outputs power generated from the servo motor;

a substrate breaking bar coupled with the transmission device; and a stage located under the transmission device and the substrate breaking bar, wherein the stage has a load-lock surface corresponding to the substrate breaking bar and the servo motor drives the transmission device to move the substrate breaking bar towards the load-lock surface;

wherein the substrate breaking bar has a first and a second stroke relative to the load-lock surface, the second stroke is closer to the load-lock surface than the first stroke, within the first stroke the servo motor drives the substrate breaking bar to move in a first speed, within the second stroke the servo motor drives the substrate breaking bar to move in a second speed, and the first speed is greater than the second speed.

26. A substrate splitting method comprising the following steps:

forming a pre-crack on a substrate;

controlling a servo motor to drive a substrate breaking bar towards the substrate; and controlling the substrate breaking bar to press the substrate at the pre-crack, wherein the step of pressing the substrate pressing includes:

disposing a pressure sensor to couple with the substrate breaking bar;

detecting a pressure exerted on the substrate breaking bar by using the pressure sensor; and halting advance of the substrate breaking bar when the pressure exerted on the substrate breaking bar reaches a pre-determined pressure value.

* * * * *